July 16, 1957    HANS-JOACHIM M. FÖRSTER    2,799,375
FLUID-ACTUATED FRICTION CLUTCHES
Filed Sept. 29, 1953                    2 Sheets-Sheet 1

INVENTOR
HANS-JOACHIM M. FÖRSTER
BY Duke and Craig
ATTORNEYS.

July 16, 1957  HANS-JOACHIM M. FÖRSTER  2,799,375
FLUID-ACTUATED FRICTION CLUTCHES Filed Sept. 29, 1953  2 Sheets-Sheet 2

INVENTOR
HANS-JOACHIM M. FÖRSTER

BY *Dicke and Craig*

ATTORNEYS

United States Patent Office 2,799,375
Patented July 16, 1957

2,799,375

FLUID-ACTUATED FRICTION CLUTCHES

Hans-Joachim M. Förster, Stuttgart-Bad Cannstatt, Germany, assignor to Daimler-Benz Aktiengesellschaft, Stuttgart-Unterturkheim, Germany Application September 29, 1953, Serial No. 383,034

Claims priority, application Germany October 2, 1952

5 Claims. (Cl. 192—85)

My invention relates to a transmission including friction clutches adapted to be actuated by a pressure fluid.

In transmissions of that kind which are applicable to automobiles, for instance, it may happen that when the transmission is shifted back to a lower speed ratio with the engine throttle being fully opened, the fluid actuation of the clutch to be engaged does not occur fast enough corresponding to the increase of the engine speed, since the cylinder housing the actuating piston for the clutch is not filled up within as short a time as required. When the automobile is driven uphill with a fully opened throttle and when the transmission is to be shifted to a lower speed ratio by disengagement of one friction clutch and engagement of another friction clutch, the time required to effect engagement of the latter should not exceed a fraction of a second, and it is an object of the present invention to reduce such time.

It is another object of the present invention to render such time independent of the position of the accelerator and of the speed of travel of the automobile.

The difficulties caused by the delayed engagement of the friction clutch may be eliminated in a known manner by substituting a one-way clutch for the friction clutch. Such one-way clutches, however, have the disadvantage that the engine may not be used to brake the vhicle. Consequently, the use of such one-way clutches is not always desirable.

More particularly, it is the object of the present invention to provide means enabling the transmission clutch to be brought into engagement within a minimum of time in harmony with a very rapid increase of the speed of the engine. More specifically, it is the object of the present invention to reduce the volume of the clutch-engaging cylinder to a fraction, e. g., to a fifth of the normal volume prior to the engagement so that the transmission clutch may be brought into engagement without any delay as soon as the gear shift lever is shifted to the respective position.

Finally, it is an object of the present invention to reduce the size of the fluid pump feeding the fluid for actuating the transmission clutches and to thus increase the efficiency of the transmission.

Figure 3:
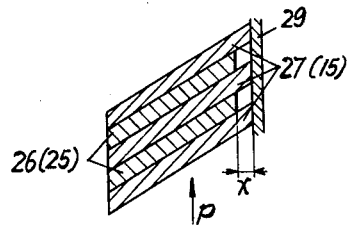
Figure 2:
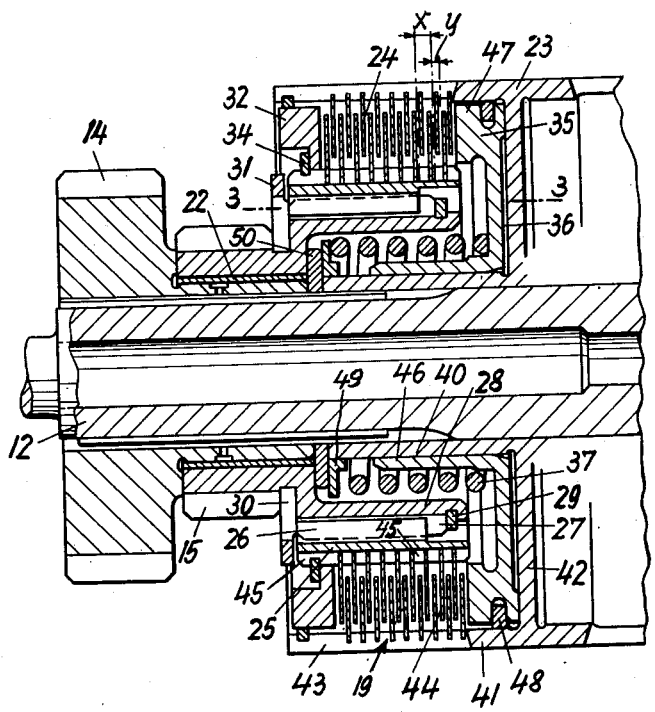
Figure 4:
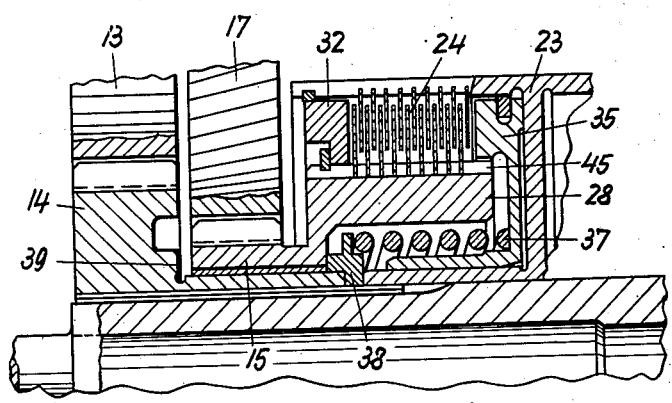
Figure 5:
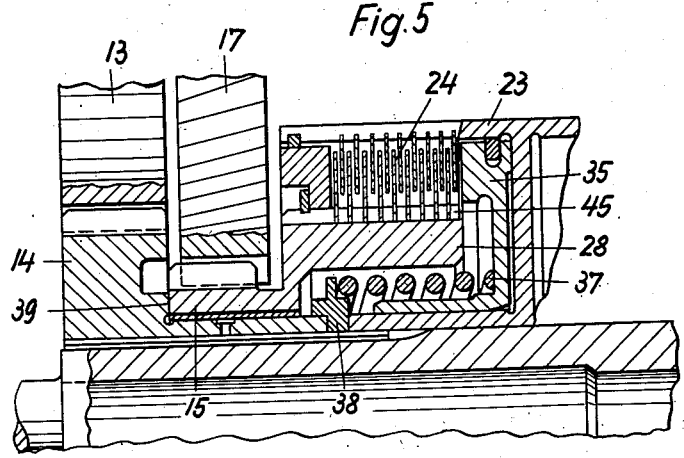

Further objects of the present invention invention will appear from the description of some preferred embodiments thereof described hereinafter with reference to the accompanying drawings, and the features of novelty will be pointed out in the claims. In the drawings, Fig. 1 is a diagrammatic longitudinal section of an automobile transmission to which the present invention is applicable, Fig. 2 is a longitudinal partial section through the transmission shown in Fig. 1, such section illustrating one of the friction clutches of the transmission on an enlarged scale, Fig. 3 is a partial section taken along the line 3—3 of Fig. 2, Fig. 4 is a view similar to that of Fig. 2 of another embodiment of the present invention, the clutch being partly engaged, and Fig. 5 illustrates the mechanism shown in Fig. 4, the clutch being fully disengaged.

Figure 1:
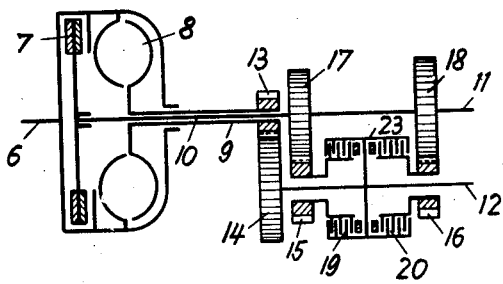

In Fig. 1 the shaft 6 of the engine is adapted to be cooperatively connected with a hollow shaft 9 by means of a hydrodynamic clutch 8. Moreover, a friction clutch 7 is adapted to connect the engine shaft 6 with an internal shaft 10 extending through the hollow shaft 9. The shaft 10 is rigidly connected with a coaxial shaft 11 constituting the outgoing shaft of the transmission which is connected at the rear axle transmission with the driving wheels of the automobile. An auxiliary shaft 12 extending parallel to the shafts 10 and 11 is permanently geared with the hollow shaft 9 by a pair of meshing gears 13 and 14 fixed to the hollow shaft 9, and to the auxiliary shaft 12 respectively. Pinions 15 and 16 freely rotatably mounted on shaft 12 but adapted to be individually clutched thereto by friction clutches 19 and 20 are in mesh with gears 17 and 18 fixed to shaft 11. The transmission may be selectively set to three different ratios of transmission.

When the transmission is set to the first speed ratio, clutches 7 and 19 are disengaged whereas clutch 20 is engaged, whereby power will be transmitted from shaft 6 to shaft 11 via the elements 8, 9, 13, 14, 20, 16 and 18.

When the transmission is set to the second speed ratio, the clutches 7 and 20 are disengaged whereas clutch 19 is engaged; power will be transmitted from shaft 6 to shaft 11 via the elements 8, 9, 13, 14, 15 and 17.

When the transmission is set to the third or direct speed ratio, the clutch 7 is engaged while clutches 19 and 20 are disengaged, the power being transmitted from shaft 6 to shaft 11 through clutch 7.

When the transmission is shifted by the driver or by suitable automatic control means from the first speed ratio to the second speed ratio, clutch 20 must be disengaged and clutch 19 must be engaged. It is the object of the means described hereinafter to reduce the time required to effect engagement of clutch 19. If desired, however, similar means may be provided to reduce the time for the engagement of clutch 20 or clutch 7. Also, the invention is applicable to transmissions having more than three ratios of transmission.

Fig. 2 shows clutch 19 on an enlarged scale. Gear 14 is splined on shaft 12 which, in its turn, is journalled in the transmission casing by means of suitable anti-friction bearings (not shown). Gear 14 is integral with a sleeve on which pinion 15 is journalled, the pinion 15 being lined with a suitable bushing 22. Moreover, a drum-shaped member 23 composed of an annular disk 42 integral with a hub sleeve 40 and an outer cylindrical sleeve 41 is firmly attached to shaft 12, for instance, shrunk thereon. A plurality of circumferentially distributed longitudinal slots splits up sleeve 41 into a multiplicity of longitudinal fingers 43 serving to axially guide a set of clutch disks 24 provided with outer teeth engaging between the fingers 43. The clutch disks 24 are mounted in interleaved relationship to a set of clutch disks 44 which are slightly spaced from fingers 43 and have internal teeth projecting between external teeth 45 provided on a rotatable cylindrical member 25 which is coaxially mounted on and surrounds a bushing 28 integral with pinion 15 and is coextensive with the teeth 43. It will be noted from Fig. 2 that the outer peripheries of the disks 44 are slightly spaced from the fingers 43 and that the inner peripheries of the clutch disks 24 are slightly spaced from the member 25 and its teeth 45. The member 25 and the pinion 15 are connected for common rotation by engaging teeth 27, and 26 respectively respectively, provided on the inside of the rotatable member 25 and on the outside of bushing 28.

From the above it will appear that the set of clutch disks 24 is mounted for common rotation with shaft 12 and gear 14, and the set of clutch disks 44 is mounted for common rotation with gear 15. By axial compression of the two interleaved sets of clutch disks 24 and 44 the gears 14 and 15 may be clutched to revolve in unison. For that purpose, a fluid-operable piston 35 is provided within the cylindrical sleeve 41, such piston being formed by an annular disk integral with a hub sleeve 46 and with a thick rim 47 provided with an external groove accommodating a piston ring 48. The end face of piston 35 adjacent to the transverse annular disk 42 is provided with a recess 36 to which fluid under pressure may be admitted through a suitable bore not shown. When that happens piston 35 will be urged to the left with reference to Fig. 2 thereby compressing the two sets of clutch disks which are slidably guided by the fingers 43 and the teeth 45 and are pressed against a ring 32 seated upon member 25 and bearing against a split ring 34 inserted in a peripheral groove of teeth 45. Axial displacement of member 25 relative to bushing 28 in either direction is limited by split rings 29 and 31, split ring 29 being inserted in a peripheral groove near the end of bushing 28, whereas split ring 31 is inserted in a peripheral groove provided between the teeth 15 and the bushing 28.

A helical spring 37 surrounding hub sleeve 46 of piston 35 bears against the latter and against a ring 49 which is mounted on sleeve 40 abutting against a stop disk 50 inserted between gear 14 and sleeve 40. In this manner, piston 35 will be resiliently held in the position shown in Fig. 2 in which the friction clutch 19 is disengaged, but by fluid pressure may be moved to the left to thereby engage clutch 19.

For the purpose of the present invention the teeth 26 and 27 are helical teeth, as will appear from Fig. 3, and the elements 28 and 25 on which those helical teeth are provided are mounted for relative axial displacement, the helix of the teeth 26 and 27 being of such a hand that when the gear 15 tends to run at a lower rotary speed than the rotatable member 25 carrying the clutch disks 44, as is true when the transmission has been set to the second speed ratio, the member 25 is urged by the teeth 27 in axial direction towards piston 35 carrying with it ring 32 whereby the clutch is partially engaged to an extent which, while not resulting in any substantial transfer of a driving couple, requires but a slight actuation of piston 35 for completion of the clutch engagement. When gear 15, however, tends to run at a higher rotary speed than the rotatable member 25, the elements 26 and 27 are brought to the axial position illustrated in Fig. 2 in which the member 25 is axially withdrawn from piston 35 corresponding to the normally disengaged position of clutch 19, as will be explained more fully hereinafter. The axial movement $x$ is so chosen that when the teeth 26 engage the split ring 29, the clutch 19 being partially engaged, the piston 35 must travel the distance $y$ for completing the engagement of clutch 19.

The function of the mechanism described is as follows:

When the transmission has been set to the first speed ratio, clutch 20 being engaged whereas clutches 7 and 19 are disengaged, the gear 15 and the bushing 28 and the teeth 27 integral therewith will run at a lower speed than the drum-shaped member 23. Because of the residual friction between the disengaged clutch disks 24 and 44 the inner rotatable member 25, which carries on the one side thereof the set of clutch disks 44 and which is provided on the other side thereof with helical teeth 26, will be taken along by the outer drum-shaped member 23 in the direction of the arrow $p$, shown in Figure 3. As a result, the rotatable member 25 which tends to run slower than member 15 is urged by the helical teeth 26 and 27 in the axial direction towards piston 35 up to the point where the teeth 26 abut against split ring 29. Since the piston 35, however, is in its initial retracted position, ring 32 will not fully engage the clutch. While the partial engagement involves a certain friction and loss of energy, such loss is negligible when the automobile is driven with the transmission set to the first speed ratio.

For shifting the transmission to the second speed ratio fluid under pressure is admitted into the space 36, whereby piston 35 will travel the distance $y$ and will thereby compress the two sets of interleaved clutch disks.

When the transmission has been shifted to third or direct gear, clutch 7 being engaged whereas clutches 19 and 20 are both disengaged, no fluid pressure prevailing in the cylinder space 36, the rotatable member 25 connected by gears 15 and 17 to the driven shaft 11 rotates faster than the rotatable member 23 connected by shaft 12, gears 14 and 13, the hollow shaft 9, and the hydrodynamic clutch 8 to the driving shaft 6. The residual friction between the clutch disks 24 and 44, therefore, tends to retard the rotatable member 25 relative to the toothed bushing 28 contrary to the arrow $p$ in Fig. 3, whereby the member 25 will be retracted in the axial direction away from piston 35 to the normally disengaged position of clutch 19 whereby the friction is minimized.

When the transmission has been set to third or direct speed and is to be shifted back to the second speed ratio, clutch 7 is disengaged and fluid under pressure will be supplied again to the cylinder space 36. When this happens the rotatable member 25 carrying the clutch disks 44 is still in retracted position, since the gear 15 geared to shaft 11 rotates at a higher speed than the rotatable member 23 carrying clutch disks 24. Owing to the disengagement of clutch 7, the engine shaft 6 will pick up speed and through elements 8, 9, 13, 14 and 12 will accelerate rotatable member 23 until the same will suddenly overtake rotatable member 25 whereupon the minimized residual friction will cause the same to be moved the distance $x$ towards piston 35 to the partially actuated position. Therefore, a small travel of piston 35 through the distance $y$ which meanwhile has taken place, is sufficient to fully engage clutch 19 to thereby set the transmission to the second speed ratio. In effect, the clutch acts as a true free-wheeling clutch preventing rotatable member 23 from overtaking gear 15 by any substantial amount and clutching the rotatable elements 23 and 25.

The feed of fluid under pressure to cylinder space 36 is preferably so selected and adjusted that the piston 35 will have moved the distance $y$ within the brief period of time needed by the engine upon disengagement of clutch 7 to pick up the speed for operating with the transmission set to the second speed ratio.

From this explanation it becomes apparent that even though the fluid under pressure will not have imparted the full stroke $x+y$ to the piston 35, the transmission will nevertheless act as though it would include a free-wheeling clutch controlling the transition from the third speed ratio to the second speed ratio.

When the vehicle is coasting at a time where the transmission is shifted from the third speed ratio to the second speed ratio, the engine throttle being closed, the shaft 6 will not be sped up upon disengagement of clutch 7 and, therefore, rotatable member 23 will not overtake and cause axial actuation of rotatable member 25, the latter remaining, as illustrated in Fig. 2, in contact with split ring 31. In this event no need exists for a very rapid engagement of clutch 19 and ample time is available for the fluid under pressure admitted into space 36 to actuate piston 35 through the distance $x+y$ until clutch 19 is disengaged.

The embodiment of the present invention illustrated in Figs. 4 and 5 differs from that described hereinabove in that the teeth 45 are provided on the bushing 28 and that the gear 15 is provided with helical teeth and has an axial clearance for movement between a retracted position in which it contacts gear 14 and an actuated position shown in Fig. 4 in which it contacts a ring 38 which corresponds to rings 49 and 50 shown in Fig. 2. The helical teeth of the gears 15 and 17 have a similar function as the helical teeth 26 and 27 of the embodiment shown in Figs. 2 and 3. Hence, it will appear that the gear 15 together with the integral bushing 28 supporting the inner clutch disks 44 are axially shiftable, and that the meshing helical gears 15 and 17 perform the function of the helical teeth 27 and 26. Fig. 4 illustrates the position of ring 32 in actuated position effecting a partial compression of the two sets of clutch disks insufficient to clutch the coaxial members 23 and 28, whereas Fig. 5 shows the elements with ring 32 being in retracted position in which the clutch is fully disengaged, gear 19 abutting against a shoulder 39 of gear 14.

Recapitulating what has been explained hereinabove it may be stated that the transmission comprises a driving shaft 6, a driven shaft 11, a pair of relatively rotatable coaxial members 23 and 25 shown in Figs. 2 and 3, or 23 and 28 shown in Figs. 4 and 5, one connected with the driving shaft 6 and the other one connected with the driven shaft 11, a first set of clutch disks 24 mounted for common rotation with the rotatable member 23, a second set of clutch disks 44 mounted on the other member 25 (Figs. 2 and 3), or 28 (Figs. 4 and 5) for common rotation therewith in interleaved relationship to the first set 24, a fluid-operable piston 35 adapted to compress the sets of disks 24 and 44 to thereby clutch the coaxial members 23 and 25, or 28 respectively, such piston being mounted for movement between an actuated position in which said sets are compressed and a retracted position in which said sets are relieved of pressure, actuating means 32 associated with said sets 24 and 44 and movable between an actuated position shown in Fig. 4, for instance, and a retracted position shown in Figs. 2 and 5 and adapted, when in said actuated position, to effect a partial compression of the sets of disks 24 and 44, such partial compression being insufficient to clutch the coaxial members 23 and 25, or 28 respectively, and shifting means, such as 26, 27, or the helical teeth of gears 15 and 17, which are responsive to the direction of relative rotation of the members 23 and 28 and are adapted in response to relative rotation in one direction to shift the actuating means 32 to actuated position and operative in response to relative rotation in the opposite direction to shift the actuating means 32 to retracted position. Preferably, the power-transmitting means which cooperatively connect shaft 11 to the rotatable member 25 (Figs. 2 and 3) or 28 (Fig. 5) include a pair of rotary elements, such as 25, 28 in Figs. 2 and 3, or 15 and 17 in Fig. 5, having engaging helical teeth and being mounted for relative axial displacement produced in response to the transfer of a driving couple by the helical teeth, one of the rotary elements, such as 25 in Figs. 2 or 28 in Fig. 5, being connected with the actuating means 32 for common axial displacement. The helical teeth constitute the above mentioned shifting means responsive to the direction of relative rotation.

The term "engaged" and "disengaged" as used herein in connection with the status of the friction clutches is used to describe the status thereof as regards the overall transmission performance, i. e., designating the condition of the particular clutch as regards transmission of torque therethrough. The residual friction which inherently exists in the clutches even in the so-called "disengaged" position thereof due to the tendency of the friction disks to stick to one another actually transmits only a negligable amount of torque which may be ignored from the overall transmission point of view and which is normally considered from that point of view only as part of the transmission losses, which, however, is sufficient to bring about the desired operation as described hereinabove.

From the above it will appear that one of the clutch elements, more particularly a clutch element supporting a set of clutch disks, is so connected with the associated shaft by helical teeth or a helical thread or the like that for acceleration in one relative direction of rotation, particularly coincidentally to the transition from a higher to a lower speed ratio, the said clutch element is partially shifted in clutching direction, such shifting movement, however, being limited by a stop, such as split ring 29, so that complete engagement of the clutch cannot be effected, the engagement being later completed by opposite actuation of the fluid-operable piston 35. Therefore, the transmission clutch, such as clutch 19, may be very rapidly engaged in conformity with a very rapid acceleration of the engine on disengagement of clutch 7. Also, when the vehicle is at rest and the motor is running, the volume of liquid to be fed to cylinder space 36 for an engagement of the clutch will be reduced to a fraction, such as a fifth of the normal volume. Therefore, when the driver shifts the gear shift lever from idling to forward speed, the transmission is ready for operation without delay. A similar effect may be obtained for the shifting of the transmission to reverse. Another advantage resides in the fact that the oil pump may be designed for feeding a comparatively small volume of oil to cylinder space 36 and may, therefore, have a small size whereby the loss of energy in the transmission will be reduced.

While I have described my invention with reference to two embodiments thereof, I wish it to be clearly understood that the same is in no way limited to the details of such embodiments, but is capable of numerous modifications within the scope of the appended claims.

What I claim is:

1. In a transmission, the combination comprising a driving shaft, a driven shaft, a pair of relatively rotatable coaxial members, one connected with said driving shaft and the other one connected with said driven shaft, a first set of clutch disks mounted for common rotation on one of said members, a second set of clutch disks mounted on the other one of said members for common rotation therewith in interleaved relationship to said first set, a fluid-operable piston adapted to compress said sets of disks to thereby clutch said coaxial members for common movement with each other and mounted for movement between an actuated position in which said sets are compressed and a retracted position in which said sets are relieved of pressure, actuating means associated with said sets and movable between a partially actuating position and a retracted position and adapted, when in said partially actuating position, to effect only a partial compression of said sets insufficient to clutch said coaxial members, and shifting means responsive to the direction of relative rotation of said members and adapted in response to relative rotation in one direction to shift said actuating means to said partially actuating position and operative in response to relative rotation in the opposite direction to shift said actuating means to said retracted position.

2. The combination claimed in claim 1 combined with power-transmitting means for cooperatively connecting one of said shafts to the associated one of said coaxial members, said shifting means including a pair of rotary elements having engaging helical teeth and being mounted for relative axial displacement produced in response to the transfer of a driving couple by said helical teeth, one of said rotary elements being connected with said actuating means for common axial displacement, such helical teeth constituting said shifting means.

3. The combination claimed in claim 2 in which said rotary elements having engaging helical teeth are coaxially disposed, one of said rotary elements carrying one of said sets of interleaved clutch disks and the other one of said rotary elements being formed by an extension of a gear constituting part of said power-transmitting means.

4. The combination claimed in claim 2 in which said rotary elements having engaging helical teeth are meshing rotary elements forming part of said power-transmitting means, one of said meshing gears being mounted for axial displacement and being rigidly connected with said actuating means and carrying one of said sets of clutch disks.

5. The combination claimed in claim 1 in which said actuating means is formed by a ring mounted for axial displacement in coaxial spaced relationship to said piston confining therewith a space accommodating said interleaved sets of clutch disks.

References Cited in the file of this patent

UNITED STATES PATENTS

| | | |
|---|---|---|
| 1,841,284 | Gillett | Jan. 12, 1932 |
| 1,987,833 | Lansing | Jan. 15, 1935 |
| 2,587,823 | De Pew | Mar. 4, 1952 |
| 2,715,455 | Miller | Aug. 16, 1955 |

FOREIGN PATENTS

| | | |
|---|---|---|
| 738,518 | Germany | Aug. 19, 1943 |
| 589,037 | France | Feb. 14, 1925 |
| 1,011,867 | France | Apr. 9, 1952 |